(12) United States Patent
Iizaka et al.

(10) Patent No.: US 11,126,810 B2
(45) Date of Patent: Sep. 21, 2021

(54) HANDCART

(71) Applicant: TOSHIBA TEC KABUSHIKI KAISHA, Tokyo (JP)

(72) Inventors: Hitoshi Iizaka, Fuji Shizuoka (JP); Hidehiro Naito, Mishima Shizuoka (JP); Takahiro Saitou, Izunokuni Shizuoka (JP); Yukiko Yokoyama, Sunto Shizuoka (JP); Masachika Kurata, Fujinomiya Shizuoka (JP); Noriyoshi Hara, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/913,444

(22) Filed: Jun. 26, 2020

(65) Prior Publication Data

US 2020/0327289 A1   Oct. 15, 2020

Related U.S. Application Data

(63) Continuation of application No. 16/268,750, filed on Feb. 6, 2019, now abandoned.

(30) Foreign Application Priority Data

Mar. 2, 2018   (JP) .............................. JP2018-038012

(51) Int. Cl.
  *G06K 15/00*  (2006.01)
  *G06K 7/10*   (2006.01)
  (Continued)

(52) U.S. Cl.
  CPC ............ *G06K 7/10722* (2013.01); *B62B 3/14* (2013.01); *B62B 3/1412* (2013.01);
  (Continued)

(58) Field of Classification Search
  CPC ....... B62B 3/14; B62B 3/1412; B62B 3/1416; B62B 3/1424; B62B 3/1428; B62B 5/0096; G06K 7/10722; G06K 7/1413
  See application file for complete search history.

(56) References Cited

U.S. PATENT DOCUMENTS 5,773,954 A   6/1998  VanHorn
5,821,512 A   10/1998 Ohagan et al.
(Continued)

FOREIGN PATENT DOCUMENTS

JP   H08-147560 A   6/1996
JP   2001-243308 A  9/2001
(Continued)

OTHER PUBLICATIONS

Extended European Search Report dated Jul. 29, 2019, filed in counterpart European Patent Application No. 19159373.0, 8 pages.
(Continued)

*Primary Examiner* — Thien M Le
(74) *Attorney, Agent, or Firm* — Kim & Stewart LLP

(57) ABSTRACT

A handcart includes a cart frame, a caster, and a code reader. The cart frame includes a receiving portion on which a shopping basket is placeable and a lateral portion extending in a width direction of the cart frame. The caster is disposed at a bottom region of the cart frame. The code reader is attached to the lateral portion of the cart frame so as to be rotatable around the lateral portion. The code reader may be rotated around the lateral portion of the cart frame to a first position at which a reading window of the code reader faces an inner space of the shopping basket on the receiving portion of the cart frame, and to a second position at which the reading window of the code reader faces a front of the cart frame.

14 Claims, 6 Drawing Sheets

(51) Int. Cl.
*B62B 3/14* (2006.01)
*G06K 7/14* (2006.01)
*B62B 5/00* (2006.01)

(52) U.S. Cl.
CPC .......... *B62B 3/1416* (2013.01); *B62B 3/1424* (2013.01); *B62B 3/1428* (2013.01); *B62B 5/0096* (2013.01); *G06K 7/1413* (2013.01)

(56) References Cited

U.S. PATENT DOCUMENTS

| | | | |
|---|---|---|---|
| 6,119,935 A | 9/2000 | Jelen et al. | |
| 6,168,079 B1* | 1/2001 | Becker | G07F 7/02 |
| | | | 235/383 |
| 6,314,406 B1 | 11/2001 | OHagan et al. | |
| 7,010,501 B1* | 3/2006 | Roslak | G06Q 20/20 |
| | | | 705/23 |
| 7,934,726 B1* | 5/2011 | Johnson | G06Q 30/0265 |
| | | | 280/33.992 |
| 8,152,062 B2 | 4/2012 | Perrier et al. | |
| 10,266,196 B1* | 4/2019 | Sinha | G06Q 99/00 |
| 10,339,515 B1* | 7/2019 | Johnson | B62B 3/1444 |
| 2006/0247847 A1* | 11/2006 | Carter | G06K 7/10366 |
| | | | 701/498 |
| 2006/0293968 A1 | 12/2006 | Brice et al. | |
| 2009/0001170 A1 | 1/2009 | He | |
| 2009/0108071 A1* | 4/2009 | Carlson | G06K 7/10811 |
| | | | 235/462.32 |
| 2009/0140850 A1 | 6/2009 | Kangas et al. | |
| 2012/0296751 A1 | 11/2012 | Napper | |
| 2015/0112825 A1 | 4/2015 | Konishi et al. | |
| 2016/0207557 A1 | 7/2016 | Olivieri | |
| 2019/0073616 A1* | 3/2019 | Lewis | G06Q 10/06398 |
| 2019/0266585 A1* | 8/2019 | Johnson | G07F 7/0886 |

FOREIGN PATENT DOCUMENTS

| | | |
|---|---|---|
| JP | 2007-257412 A | 10/2007 |
| JP | 2008-539124 A | 11/2008 |
| JP | 2010-280468 A | 12/2010 |
| JP | 2012-218502 A | 11/2012 |
| JP | 5711773 B2 | 5/2015 |
| JP | 2015-109061 A | 6/2015 |
| KR | 101830819 B1 | 2/2018 |
| WO | 2006/117627 A1 | 11/2006 |
| WO | 2015172766 A1 | 11/2015 |

OTHER PUBLICATIONS

European Communication from the Examining Division dated May 20, 2021, mailed in counterpart European Patent Application No. 19159373.0, 5 pages.

* cited by examiner

HANDCART

CROSS-REFERENCE TO RELATED APPLICATIONS

This application is a continuation of U.S. patent application Ser. No. 16/268,750, filed on Feb. 6, 2019, which is based upon and claims the benefit of priority from Japanese Patent Application No. 2018-038012, filed on Mar. 2, 2018, the entire contents of each of which are incorporated herein by reference.

FIELD

An embodiment described herein relates generally to a handcart.

BACKGROUND

A shopping cart such as a handcart is used by a customer in a store such as a supermarket or a shopping mall. There is a shopping cart of one type having a code scanner for the customer to read commodity codes attached to commodities. The shopping cart may also have a display device that displays commodity names, unit prices, and the like of the commodities of which commodity codes are read by the code scanner.

A conventional code scanner is attached to a specific position of a shopping cart, e.g., a position in a level of the waist to the chest of the customer for such a conventional code scanner attached to a shopping cart, the customer may need to lift a heavy commodity to near the scanner and scan a commodity code. Also, the customer may need to tilt a commodity that is undesirable to tilt, such as food products.

DETAILED DESCRIPTION

An embodiment is directed to providing a handcart in which a reading direction of a scanner attached to the handcart can be changed to allow a customer to easily read a commodity code.

In general, according to an embodiment, a handcart includes a cart frame, a caster, and a code reader. The cart frame includes a receiving portion on which a shopping basket is placeable and a lateral portion extending in a width direction of the cart frame. The caster is disposed at a bottom region of the cart frame. The code reader is attached to the lateral portion of the cart frame so as to be rotatable around the lateral portion.

Figure 1:
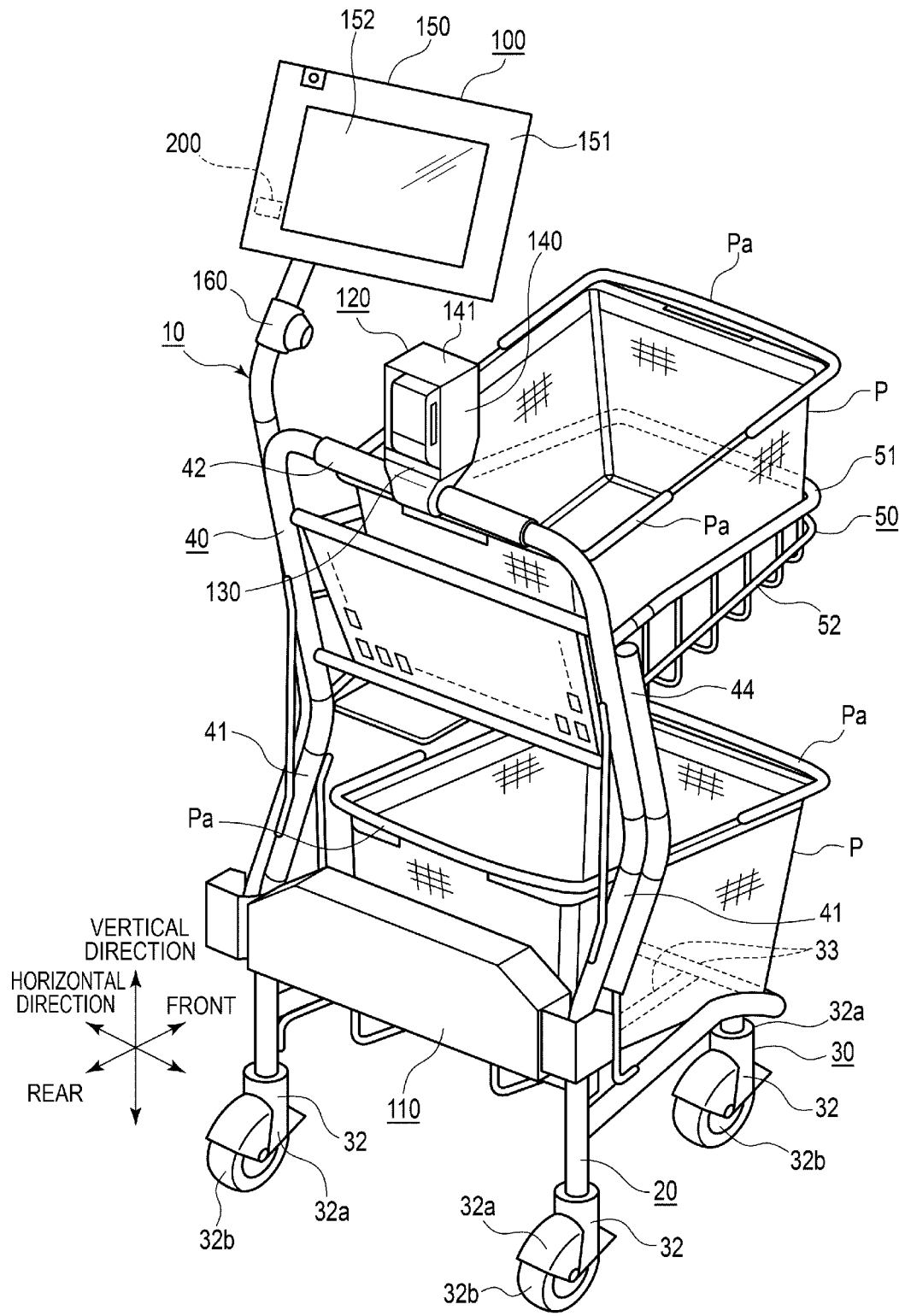
FIG. 1 illustrates an exterior perspective view of a shopping cart according to an embodiment.
Figure 2:
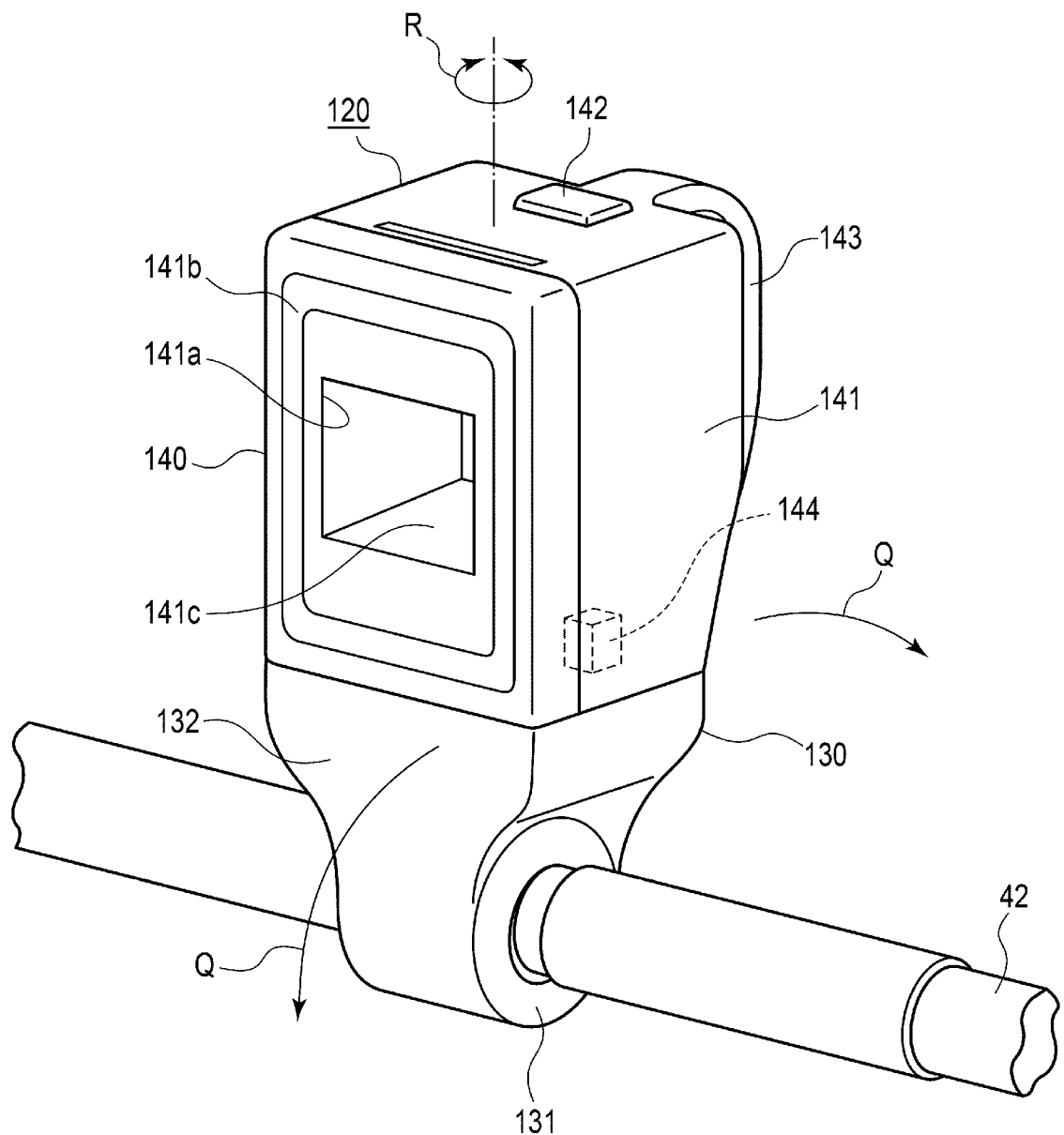
FIG. 2 illustrates a perspective view of a scanner attached to the shopping cart.
Figure 3:
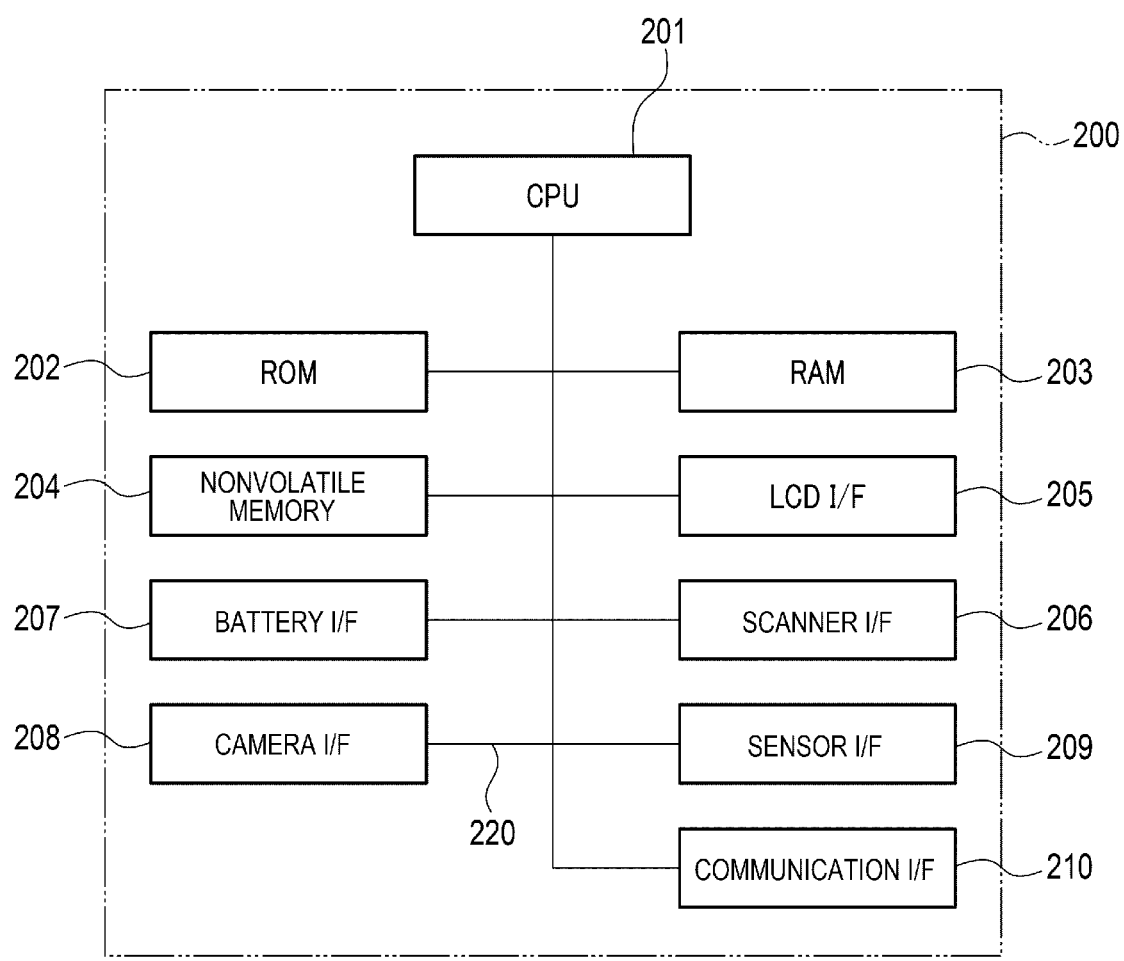
FIG. 3 is a block diagram illustrating functional units of a control section of the shopping cart.
Figure 4:
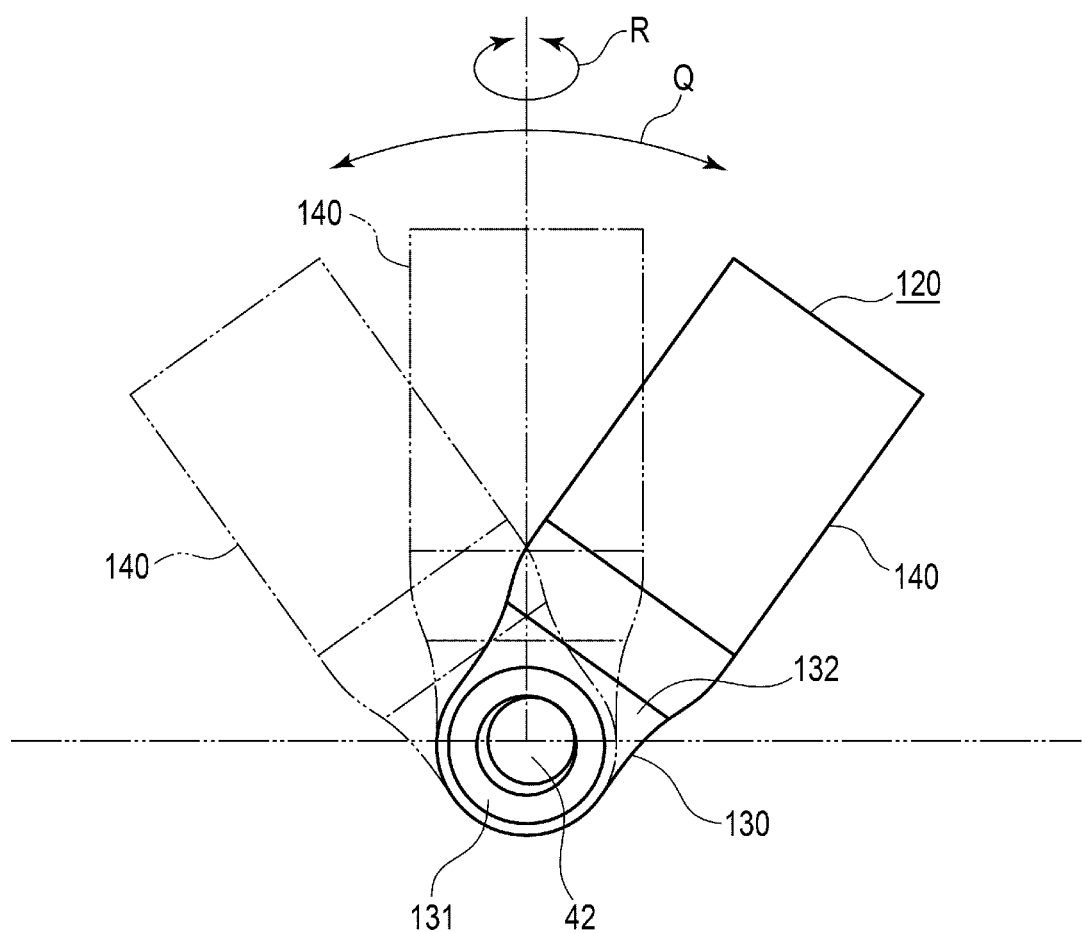
FIG. 4 illustrates a schematic side view of a scanner to explain a tilt operation of the scanner.

An embodiment is described below with reference to the drawings. FIG. 1 illustrates an exterior perspective view of a shopping cart (e.g., a handcart) 10. FIG. 2 illustrates a perspective view of a scanner attached to the shopping cart 10. FIG. 3 is a block diagram illustrating a control section 200 of the shopping cart 10. FIG. 4 illustrates a schematic side view of the scanner to explain a tilt operation of the scanner. In this embodiment, a handle frame section 40 side is referred to as the rear, and a projecting direction of a basket receiving section 50 projecting from the handle frame section 40 is referred to as the front.

Although not illustrated in FIG. 1, the shopping cart 10 functions as a register that reads a commodity code of a commodity that a customer desires to purchase. A list of read commodities is transferred to a checkout machine, which is a separate apparatus. The customer performs payment using the checkout machine.

As illustrated in FIG. 1, the shopping cart 10 according to this embodiment includes a cart section 20 that carries a shopping basket P that stores commodities and an electrical section 100 attached to the cart section 20. The cart section 20 includes a caster section 30 for smoothly moving the shopping cart 10 on the floor surface, a handle frame section 40 vertically provided on a rear wheel side of the caster section 30, and a basket receiving section 50 attached to an intermediate position in the height direction of the handle frame section 40 to be directed forward. The shopping basket P can be placed on the caster section 30 and the basket receiving section 50 as appropriate. The shopping basket P includes a handle Pa that swings.

The caster section 30 includes a frame 31 having a square frame shape, the rear side of which is open, and casters 32 respectively provided at four corners of the frame 31. The casters 32 include brackets 32a that freely turn around axes in the vertical direction and include, in the brackets 32a, wheels 32b that are made of rubber or resin and freely turn in the horizontal direction. A receiving section 33 is provided in the frame 31. The receiving section 33 is formed in dimensions for allowing a lower part of the shopping basket P to fit in the receiving section 33.

The handle frame section 40 includes vertical frames 41 respectively attached to left and right rear wheel sides of the caster section 30 and a handlebar (a lateral frame) 42 in the horizontal direction that connects the upper ends of the vertical frames 41. An extended arm 43 is attached to the vertical frame 41 on the left side. A reinforcing material 44 is attached to the handle frame section 40.

The basket receiving section 50 includes a frame 51 having a square frame shape and a receiving section 52 provided on the lower side of the frame 51. The receiving section 52 is formed in dimensions for allowing the lower part of the shopping basket P to fit in the receiving section 52.

The electrical section 100 is provided above the caster section 30. A battery section 110 attached between the vertical frames 41 on the lower end side of the handle frame section 40 and a scanner device 120 for reading a commodity code are provided. The electrical section 100 includes a display 150 that displays various kinds of information such as a commodity name and a unit price of a commodity read by a scanner 140 explained below and a camera 160 that images the inside of the shopping basket P and the like. The battery section 110 supplies electric power to the scanner device 120, the display 150, and the camera 160 via a power line incorporated in the handle frame section 40. The scanner device 120, the display 150, and the camera 160 are connected to one another by cables incorporated in the handle frame section 40 and the extended arm 43. The display 150 is attached to the upper end of the extended arm 43. The camera 160 is attached to a halfway part of the extended arm 43. The shopping cart 10 functioning as a register that reads a commodity code of a commodity that a customer desires to purchase is configured by these components.

As illustrated in FIG. 2, the scanner device 120 includes a scanner holder 130 attached to the handlebar 42 and a scanner (a commodity-code reading device) 140 detachably attached to the scanner holder 130 and configured to read a commodity code for specifying a commodity.

The scanner holder 130 includes a holder base 131 in a lower part fastened to the handlebar 42 and a holder housing 132 provided in an upper part of the holder base 131. The holder base 131 has a tilt function for tilting the holder housing 132 respectively in front and rear directions of the cart section 20 with respect to the vertical direction at a maximum angle of 90° as indicated by an arrow Q in FIGS. 2 and 4. The holder base 131 also has a turning function for turning the holder housing 132 around an axis in the vertical direction as indicated by an arrow R in FIGS. 2 and 4.

The scanner 140 includes a substantially rectangular parallelepiped scanner body 141. An opening section 141a is provided on the front surface of the scanner body 141. The opening section 141a is closed by a glass plate 141b. A reading section 141c is provided in the opening section 141a.

A scanner trigger 142 for starting a scanner operation with the reading section 141c is provided on the upper surface of the scanner body 141. A handle 143 is provided on the rear surface of the scanner body 141. The scanner body 141 includes, on the inside, a gyro sensor 144 for detecting the direction (orientation) of the reading section 141c. The gyro sensor 144 can detect a tilt and a turning direction of the gyro sensor 144.

The scanner 140 has a function of segmenting a region equivalent to a barcode out of an image photographed by the camera 160 and recognizing the barcode through image processing. The scanner 140 reads commodity codes attached to commodities displayed in a store. The commodity codes are associated with the commodities.

The display 150 includes a display panel 152 having a touch panel function. The display panel 152 is provided on the front surface of a terminal housing 151. A control section 200 that controls the battery section 110, the scanner device 120, the display 150, and the camera 160 is provided on the inside of the terminal housing 151.

As illustrated in FIG. 4, in the control section 200, a ROM (Read Only Memory) 202 that stores data in a non-rewritable manner, a RAM (Random Access Memory) 203 that stores variable data in a rewritable manner and functions as a work area or the like of a CPU (Central processing Unit) 201, and a nonvolatile memory 204 are connected to, via a bus line 220, the CPU 201 that controls these functional units. In the RAM 203, a storage region for storing a commodity master downloaded from a host server and a shopping list created on the basis of a commodity code read by the customer and the commodity master is provided. Computer programs executed by the CPU 201 are stored in the nonvolatile memory 204. Further, the CPU 201 is connected to an interface 205 with the display panel 152, an interface 206 with the scanner 140, an interface 207 with the battery section 110, an interface 208 with the camera 160, and an interface 209 with the gyro sensor 144 via the bus line 220. The CPU 201 is connected to a communication interface 210 via the bus line 220. The CPU 201 performs communication with the checkout machine, the host server, and the like via the communication interface 210.

The CPU 201 has a function (a function of a discriminating section) of extracting a barcode region from an image of a read commodity code and validating the read commodity code only if the barcode region is larger than a predetermined size. Before reading a commodity code, the CPU 201 may extract a barcode region from an image of the commodity code and allow reading of the commodity code only if the barcode region is larger than the predetermined size.

The shopping cart 10 configured in this way can be used as explained below. That is, in the beginning, the shopping cart 10 is placed in an entrance or the like of the store. At this time, the scanner 140 is directed to any direction with respect to the scanner holder 130.

Subsequently, the customer pulls out the shopping cart 10 that the customer uses. The customer holds the scanner 140 and performs a tilt operation or a turning operation to direct the scanner 140 in a desired direction of the customer. The customer takes the shopping basket P and places the shopping basket P on the caster section 30 or the basket receiving section 50. The customer moves the shopping cart 10 toward a commodity shelf on which commodities are displayed while pushing the handlebar 42.

As a method of reading a commodity code, there is a manual recognition method for pressing the scanner trigger 142 to read the commodity code and an automatic recognition method for reading the commodity code without pressing the scanner trigger 142. First, the manual recognition method is explained. The store may set the manual recognition method and the automatic recognition method, or the customer may set the manual recognition method and the automatic recognition method according to preference of the customer.

The customer takes out a target commodity from the commodity shelf, brings a commodity code of the commodity close to the opening section 141a of the scanner 140 while keeping the scanner 140 inserted into the scanner holder 130, and presses the scanner trigger 142. Consequently, the commodity code is read by the scanner 140. Read information is sent to the control section 200, saved in the RAM 203, and displayed on the display panel 152 as a commodity name and an amount. The customer puts the commodity in the shopping basket P placed on the caster section 30 or the basket receiving section 50.

On the other hand, concerning a heavy commodity (e.g., a beverage or rice), the customer tilts the scanner 140 to the downward direction as indicated by a solid line in FIG. 4, takes out the commodity from the commodity shelf, and brings the commodity close to the reading section 141c. The customer presses the scanner trigger 142 to read a commodity code of the commodity. In this case, it is unnecessary to lift the commodity to the height of the handlebar 42. The customer puts the commodity in the shopping basket P on the basket receiving section 50.

For a commodity (e.g., a daily dish or sashimi) undesirable to be tilted at a certain angle or more, similarly, as illustrated in FIG. 4, the customer tilts the scanner 140 to the downward direction, takes out the commodity from the commodity shelf, and presses the scanner trigger 142 without tilting the commodity. Consequently, a commodity code reading operation is performed. A read commodity code is processed by the control section 200 as explained above.

On the other hand, in the case of the automatic recognition method, the customer brings a commodity close to the front of the reading section 141c of the scanner 140 without tilting the scanner 140 downward. Consequently, the scanner 140 automatically performs a commodity code reading operation regardless of the operation of the scanner trigger 142.

In the case of the heavy commodity and the commodity undesirable to be tilted, the customer tilts the scanner 140. At this time, the customer may direct the reading section 141c to the basket receiving section 50 side. Since the tilt operation and the turning operation of the reading section 141c are already detected by the gyro sensor 144, the control section 200 recognizes that an imaging direction of the reading section 141c is directed to the basket receiving section 50 side. In an embodiment, the operation of the scanner 140 and/or the operation of the CPU 201 may be activated upon the gyro sensor 144 detecting that the reading section 141c is directed to the basket receiving section 50 side.

Figure 5:
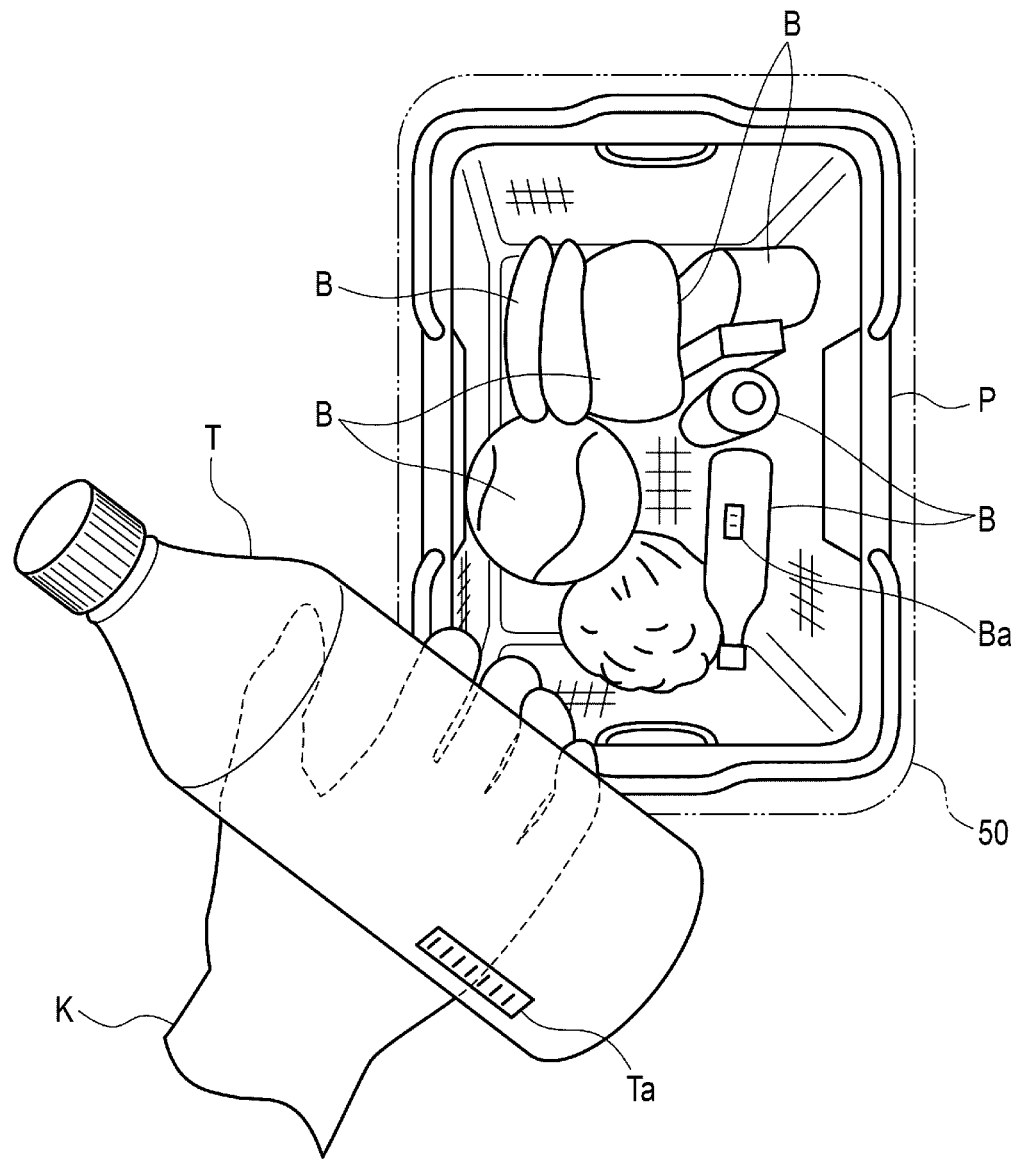
FIG. 5 illustrates an example of an image captured by the scanner.
Figure 6:
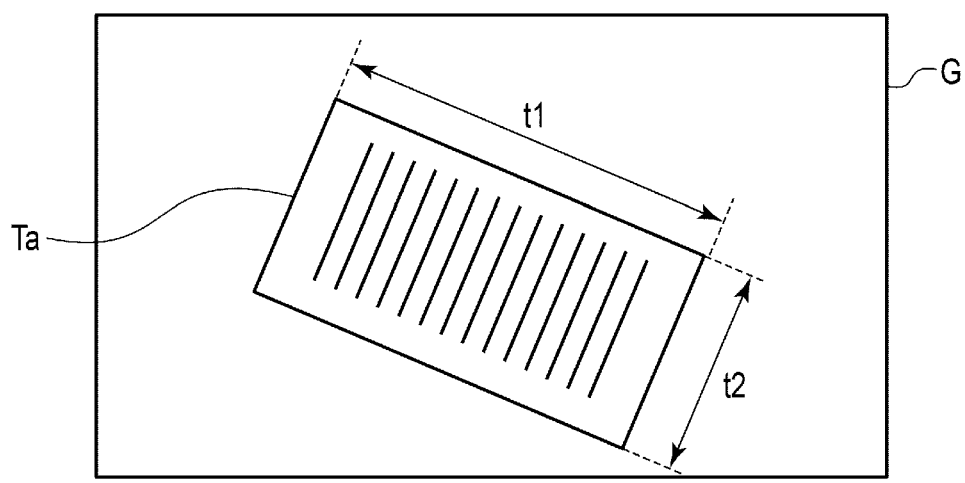
FIG. 6 is a diagram to explain image processing of the scanner.
Figure 7:
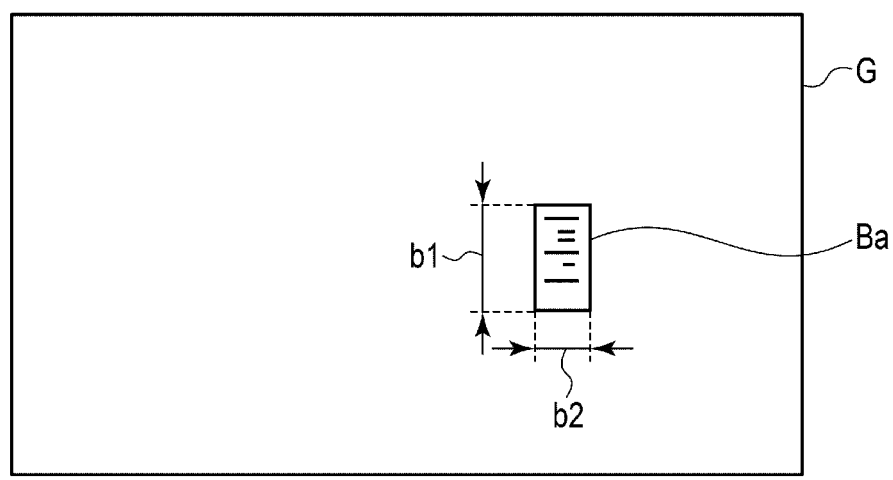
FIG. 7 is a diagram to explain the image processing of the scanner.

FIG. 5 illustrates an example of an image obtained by the reading section 141c. FIGS. 6 and 7 illustrate an example of image processing. In FIG. 5, K represents the left hand of the customer, T represents a commodity held by the left hand K of the customer, Ta represents a barcode representing a commodity code of the commodity T, B represents commodities in the shopping basket P, and Ba represents a barcode representing a commodity code attached to the commodity B.

As illustrated in FIG. 5, two commodity codes Ta and Ba are imaged by the reading section 141c. A barcode region in which a commodity code is photographed is segmented from an image captured when a reading operation is performed in the control section 200.

Subsequently, as illustrated in FIGS. 6 and 7, the CPU 201 determines longitudinal and lateral dimensions of the barcode region. That is, in the case of the commodity code Ta, the CPU 201 determines dimensions t1 and t2. In the case of the commodity code Ba, the CPU 201 determines dimensions b1 and b2. Thresholds are set in advance for the dimensions. The CPU 201 determines that a read commodity code is valid only if the dimensions are larger than predetermined dimensions. In FIGS. 6 and 7, the commodity code Ta is determined as valid because the commodity code Ta is larger than the predetermined dimensions. In this case, the commodity code Ta is displayed on the display 150. The commodity code Ba is determined as invalid because the commodity code Ba is smaller than the predetermined dimensions. In this case, the commodity code Ba is not displayed on the display 150.

In the above explanation, the control section 200 determines validity and invalidity after reading the commodity code. However, before reading of the commodity code, according to the size of the barcode region, the control section 200 may convert (decode) an image of a barcode into a commodity code only if the barcode region is larger than a predetermined size.

In this way, the customer can determine a tilt and a direction of the scanner 140 according to preference of the customer. Therefore, usability of the scanner 140 is improved. In particular, for the heavy commodity and the commodity undesirable to be tilted, the customer can cause the scanner 140 to appropriately read the commodity code by, for example, tilting the scanner 140 itself. In this case, if the scanner 140 is tilted to the shopping basket P side, a reading operation is performed on the basis of the size of the commodity code in order to distinguish the commodity B already stored in the shopping basket P and the commodity T, the commodity code of which is to be read. Therefore, misrecognition can be prevented.

If the customer finishes purchasing all commodities that the customer desires to purchase, the customer moves to the checkout machine. For example, the customer operates the touch panel of the display 150 to transmit the shopping list stored in the RAM 203 to the checkout machine. The customer performs payment using the checkout machine. After finishing the payment, the customer returns the shopping cart 10 to a predetermined position of the store.

In the above explanation of the embodiment, the scanner 140 is capable of tilting and turning in a state in which the scanner 140 is set on the handlebar 42. However, the turning mechanism may be omitted. Besides, the customer may detach the scanner 140 from the scanner holder 130 and bring the scanner 140 close to a commodity to perform reading of the commodity. In this case as well, a sensor may determine whether or not the customer directs the reading section 141c of the scanner 140 to the shopping basket P side and distinguish a commodity that is read by the customer from a commodity put in the shopping basket P.

In the embodiment, the size of the barcode region is determined only if the reading section 141c is directed to the shopping basket P in a placing section. However, for example, in the case of an automatic recognition type for always recognizing an image, it is likely that a commodity bar code of a commodity on a commodity shelf is recognized even in a state in which the customer is walking while pushing the shopping cart 10. Therefore, the size of the barcode region may be determined irrespective of the angle and the direction of the reading section 141c.

Further, in the embodiment, the gyro sensor is used as means for detecting a tilt and a turning position of the scanner 140. However, a sensor that mechanically or electrically detects a tilt and a direction with a microswitch or the like provided in the scanner 140 or the holder base 131 may be used.

While a certain embodiment has been explained above the embodiment is presented as an example and is not intended to limit the scope of the invention. The new embodiment can be implemented in other various forms. Various omissions, substitutions, and changes can be performed without departing from the spirit of the invention. The embodiment and modifications of the embodiment are included in the scope and the gist of the invention and included in the inventions described in claims and the scope of equivalents of the inventions.

What is claimed is:

1. A handcart comprising:
   a cart frame including a receiving portion on which a shopping basket is placeable and a lateral portion extending in a width direction of the cart frame;
   a caster disposed at a bottom region of the cart frame;
   a code reader configured to perform code reading to obtain a scanned image including a code symbol on a product and attached to the lateral portion of the cart frame so as to be rotatable around the lateral portion of the cart frame to a first position at which an image capturing window of the code reader faces an inner space of the shopping basket on the receiving portion of the cart frame, and to a second position at which the image capturing window of the code reader faces a front of the cart frame; and
   a processing device configured to:
      perform image processing on the scanned image to determine an image region of the code symbol in the scanned image;
      measure a first length of the image region in a first direction and a second length of the image region in a second direction different from the first direction, and determine whether or not the image region is greater than a predetermined size based on the first and second lengths; and convert the code symbol to a product code represented thereby, upon determining that the image region of the code symbol in the scanned image is greater than the predetermined size.

2. The handcart according to claim 1, wherein the first direction is along a first edge of the image region and the second direction is along a second edge of the image region crossing the first edge.

3. The handcart according to claim 1, wherein the lateral portion of the cart frame is a handle portion disposed at a rear region of the cart frame.

4. The handcart according to claim 1, wherein the code reader is configured to operate in a first mode during which the code reader carries out code reading in response to an operation of a scanner trigger, and in a second mode during which the code reader carries out code reading without the operation of the scanner trigger.

5. The handcart according to claim 1, wherein the processing device does not perform conversion of the code symbol to the product code represented thereby when determining that the image region of the code symbol in the scanned image is less than the predetermined size.

6. The handcart according to claim 1, further comprising:
a gyro sensor configured to detect an orientation of the code reader, wherein
the processing device is enabled to perform the image processing when the code reader is detected by the gyro sensor to be oriented so that the image capturing window of the code reader faces the inner space of the shopping basket on the receiving portion of the cart frame.

7. The handcart according to claim 1, wherein the handcart further comprises a display device configured to display information corresponding to the obtained scanned image.

8. The handcart according to claim 1, further comprising:
a camera positioned to capture an image of a region including an inner space of the shopping basket.

9. The handcart according to claim 1, further comprising:
a battery coupled to a portion of the cart frame below the lateral portion, the battery being electrically connected to the code reader to supply power thereto.

10. The handcart according to claim 1, wherein the code reader is attached to a center of the lateral portion in a width direction of the cart frame.

11. A method for registering a product code during shopping:
placing a shopping basket on a receiving portion of a cart frame of a handcart;
placing a product in the shopping basket;
rotating a code reader attached to a lateral portion of the cart frame of the handcart around the lateral portion so that an image capturing window of the code reader faces an inner space of the shopping basket on the receiving portion;
performing a code reading operation with the code reader to obtain a scanned image including a code symbol on the product, after the code reader has been rotated to position the image capturing window of the code reader to face the inner space of the shopping basket;
performing image processing on the scanned image to determine an image region of the code symbol in the scanned image;
measuring a first length of the image region in a first direction and a second length of the image region in a second direction different from the first direction;
determining whether or not the image region is greater than a predetermined size based on the first and second lengths; and
converting the code symbol to a product code represented thereby, upon determining that the image region of the code symbol in the scanned image is greater than the predetermined size.

12. The method according to claim 11, wherein the first direction is along a first edge of the image region and the second direction is along a second edge of the image region crossing the first edge.

13. The method according to claim 11, wherein said performing the code reading operation comprises:
operating, by a user, a scanner trigger of the code reader; and
in response to operation of the scanner trigger, starting the code reading operation.

14. The method according to claim 11, further comprising:
detecting an orientation of the code reader with a gyro sensor; and
enabling the image processing when the code reader is detected by the gyro sensor to be oriented so that the image capturing window of the code reader faces the inner space of the shopping basket on the receiving portion of the cart frame.

* * * * *